(12) United States Patent
Syput et al.

(10) Patent No.: US 8,992,753 B2
(45) Date of Patent: Mar. 31, 2015

(54) ELECTRODEPOSITABLE AQUEOUS RESINOUS DISPERSIONS AND LOW GLOSS COATINGS PRODUCED THEREFROM

(75) Inventors: Richard F. Syput, Lower Burrell, PA (US); Matthew S. Scott, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 244 days.

(21) Appl. No.: 13/551,780

(22) Filed: Jul. 18, 2012

(65) Prior Publication Data

US 2014/0021051 A1    Jan. 23, 2014

(51) Int. Cl.
| | |
|---|---|
| C25D 13/10 | (2006.01) |
| C25D 13/06 | (2006.01) |
| C09D 5/44 | (2006.01) |
| C25D 13/04 | (2006.01) |
| C25D 15/00 | (2006.01) |

(52) U.S. Cl.
CPC .............. C09D 5/4465 (2013.01); C25D 13/04 (2013.01); C25D 15/00 (2013.01)
USPC .......................................... 204/506; 523/415

(58) Field of Classification Search
USPC .......................................... 204/506; 523/415
See application file for complete search history.

(56) References Cited

U.S. PATENT DOCUMENTS

| | | |
|---|---|---|
| 3,332,866 A | 7/1967 | Wszolek |
| 3,455,806 A | 7/1969 | Spoor et al. |
| 3,793,278 A | 2/1974 | De Bona |
| 3,928,157 A | 12/1975 | Suematsu et al. |
| 3,937,679 A | 2/1976 | Bosso et al. |
| 3,947,338 A | 3/1976 | Jerabek et al. |
| 3,962,165 A | 6/1976 | Bosso et al. |
| 3,975,346 A | 8/1976 | Bosso et al. |
| 3,984,299 A | 10/1976 | Jerabek |
| 4,001,156 A | 1/1977 | Bosso et al. |
| 4,031,050 A | 6/1977 | Jerabek |
| 4,081,341 A | 3/1978 | Christenson et al. |
| 4,104,147 A | 8/1978 | Marchetti et al. |
| 4,432,850 A | 2/1984 | Moriarity et al. |
| 4,452,963 A | 6/1984 | Moriarity |
| 4,891,111 A | 1/1990 | McCollum et al. |
| 5,064,908 A | 11/1991 | Schuster et al. |
| 6,017,431 A | 1/2000 | Augustini et al. |
| 6,887,360 B2 | 5/2005 | Retzlaff et al. |
| 7,842,762 B2 | 11/2010 | Zawacky et al. |
| 2003/0054193 A1 | 3/2003 | McCollum et al. |
| 2008/0254284 A1 | 10/2008 | Tersteeg |
| 2009/0035476 A1 | 2/2009 | Uemura et al. |
| 2011/0213057 A1 | 9/2011 | Fenn et al. |

FOREIGN PATENT DOCUMENTS

| | | |
|---|---|---|
| EP | 0012463 | 6/1982 |
| JP | 60135466 | 7/1985 |
| JP | 63268775 | 11/1988 |

*Primary Examiner* — Kishor Mayekar

(74) *Attorney, Agent, or Firm* — Alicia M. Passerin, Esq.

(57) ABSTRACT

Disclosed are aqueous resinous dispersions that are electrodepositable and exhibit good anti-settling properties, as well as to their use to produce smooth, low gloss coatings. The aqueous resinous dispersions include an active hydrogen-containing, cationic salt group-containing polymer; a curing agent; and oxidized polyolefin particles.

18 Claims, No Drawings

ELECTRODEPOSITABLE AQUEOUS RESINOUS DISPERSIONS AND LOW GLOSS COATINGS PRODUCED THEREFROM

FIELD

The present invention relates to aqueous resinous dispersions that are electrodepositable and exhibit good anti-settling properties, as well as to their use to produce smooth, low gloss coatings. The present invention also relates to methods for making such aqueous resinous dispersions.

BACKGROUND

Electrodeposition as a coating application method involves the deposition onto a conductive substrate of a film-forming composition under the influence of an applied electrical potential. Electrodeposition has gained popularity in the coatings industry because it provides higher paint utilization, outstanding corrosion resistance, and low environmental contamination as compared with non-electrophoretic coating methods. Both cationic and anionic electrodeposition are used commercially, with cationic being more prevalent in applications desiring a high level of corrosion protection.

There are a number of decorative applications in which it is desired to control the gloss of a coating layer applied by cationic electrodeposition. Electrodeposited coatings having high gloss levels are readily achievable, but acceptable cationically electrodeposited coatings with a low gloss level have been more difficult to prepare. Addition of traditional flatting agents, such as silicas and alumina silicates, to electrodepositable coating compositions will produce the desired gloss levels, but these flatting agents are often much more dense than other bath components and will settle in the electrocoat baths. Continuous recirculation must therefore be employed to maintain paint homogeneity, even when the bath is not in use. The need for continuous recirculation leads to higher capital equipment costs, higher maintenance costs, and higher energy costs. In addition, the density of these flatting agents often results in coatings with an uneven appearance that lacks smoothness, especially when coating complex parts and areas in which mixing is not consistent.

As a result, it would be desirable to provide cationic electrodepositable compositions with good anti-settling properties that provide smooth, low gloss coatings.

SUMMARY OF THE INVENTION

In certain respects, the present invention is directed to aqueous resinous dispersions comprising: (a) an active hydrogen-containing, cationic salt group-containing polymer; (b) a curing agent; and (c) 0.3 to 20 parts by weight oxidized polyolefin particles, based on the total solids weight of the dispersion.

In another respect, the present invention is directed to coatings deposited over at least a portion of a substrate and having a 60° gloss of no more than 40 that are deposited from an aqueous resinous dispersion comprising: (a) an active hydrogen-containing, cationic salt group-containing polymer; (b) a curing agent; and (c) oxidized polyolefin particles.

In still other respects, the present invention is directed to methods for making a cationically electrodepositable aqueous resinous dispersion. These methods comprise combining: (a) a first aqueous resinous dispersion comprising an active hydrogen-containing, cationic salt group-containing polymer, and (b) a second aqueous resinous dispersion comprising: (i) oxidized polyolefin particles; and (ii) an active hydrogen-containing, cationic salt group-containing polymer.

The present invention is also directed to related coating methods and coated substrates.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As indicated, certain embodiments of the present invention are directed to aqueous resinous dispersions. As used herein, the term "aqueous resinous dispersion" refers to a two-phase transparent, translucent or opaque resinous system in which a polymer is in the dispersed phase and the dispersing medium, which includes water, is in the continuous phase. In the present invention, these aqueous resinous dispersions are electrodepositable aqueous resinous dispersions. As used herein, "electrodepositable aqueous resinous dispersion" refers to an aqueous dispersion that is suitable for use in or as an electrodepositable coating composition, that is, a coating composition that is capable of being deposited onto a conductive substrate under the influence of an applied electrical potential. In certain embodiments, the aqueous resinous dispersions described herein are stable dispersions. As used herein, the term "stable dispersion" refers to a dispersion that does not gel, flocculate or precipitate when maintained at a temperature of 25° C. for at least 60 days, or, if some precipitation does occur, the precipitate can be redispersed upon agitation.

As will be appreciated, besides water, the dispersing medium can, in certain embodiments, contain some organic cosolvents. In certain embodiments, the organic cosolvents are at least partially soluble with water. Examples of such solvents include oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols. Examples of other at least partially water-miscible solvents include alcohols such as ethanol, isopropanol, butanol and diacetone alcohol. If used, the organic cosolvents are, in certain embodiments, used in amounts less than 10 percent by weight, such as less than 5 percent by weight, based on total weight of the dispersing medium.

As indicated earlier, the aqueous resinous dispersions of the present invention comprise an active hydrogen-containing, cationic salt group-containing polymer. As used herein, the term "active hydrogen-containing, cationic salt group-containing polymer" refers to polymers that include active hydrogen functional groups and at least partially neutralized cationic groups, such as sulfonium groups and amine groups, which impart a positive charge. As used herein, the term "polymer" encompasses, but is not limited to, oligomers and both homopolymers and copolymers. As used herein, the term "active hydrogen functional groups" refers to those groups that are reactive with isocyanates as determined by the Zerewitnoff test as is described in the JOURNAL OF THE AMERICAN CHEMICAL SOCIETY, Vol. 49, page 3181 (1927) and include, for example, hydroxyl groups, primary or secondary amine groups, and thiol groups. In certain embodiments, the active hydrogen functional groups are hydroxyl groups, primary amine groups and/or secondary amine groups.

Examples of polymers that are suitable for use as the active hydrogen-containing, cationic salt group-containing polymer in the present invention include, but are not limited to, alkyd polymers, acrylics, polyepoxides, polyamides, polyurethanes, polyureas, polyethers, and polyesters, among others.

More specific examples of suitable active hydrogen-containing, cationic salt group containing polymers include polycpoxide-amine adducts, such as the adduct of a polyglycidyl ethers of a polyphenol, such as Bisphenol A, and primary and/or secondary amines, such as are described in U.S. Pat. No. 4,031,050 at col. 3, line 27 to col. 5, line 50, U.S. Pat. No. 4,452,963 at col. 5, line 58 to col. 6, line 66, and U.S. Pat. No. 6,017,432 at col. 2, line 66 to col. 6, line 26, these portions of which being incorporated herein by reference. In certain embodiments, a portion of the amine that is reacted with the polyepoxide is a ketimine of a polyamine, as is described in U.S. Pat. No. 4,104,147 at col. 6, line 23 to col. 7, line 23, the cited portion of which being incorporated herein by reference. Also suitable are ungelled polyepoxide-polyoxyalkylenepolyamine resins, such as are described in U.S. Pat. No. 4,432,850 at col. 2, line 60 to col. 5, line 58, the cited portion of which being incorporated herein by reference. In addition, cationic acrylic resins, such as those described in U.S. Pat. No. 3,455,806 at col. 2, line 18 to col. 3, line 61 and U.S. Pat. No. 3,928,157 at col. 2, line 29 to col. 3, line 21, these portions of both of which being incorporated herein by reference, can be used.

Besides amine salt group-containing resins, quaternary ammonium salt group-containing resins can also be employed as a cationic salt group-containing polymer in the present invention. Examples of these resins are those which are formed from reacting an organic polyepoxide with a tertiary amine acid salt. Such resins are described in U.S. Pat. No. 3,962,165 at col. 2, line 3 to col. 11, line 7, U.S. Pat. No. 3,975,346 at col. 1, line 62 to col. 17, line 25, and U.S. Pat. No. 4,001,156 at col. 1, line 37 to col. 16, line 7, these portions of which being incorporated herein by reference. Examples of other suitable cationic resins include ternary sulfonium salt group-containing resins, such as those described in U.S. Pat. No. 3,793,278 at col. 1, line 32 to col. 5, line 20, this portion of which being incorporated herein by reference. Also, cationic resins which cure via a transesterification mechanism, such as described in European Patent Application No. 12463B1 at p. 2, line 1 to p. 6, line 25, this portion of which being incorporated herein by reference, can also be employed.

Other suitable cationic salt group-containing resins include those that may form photodegradation resistant electrodepositable coating compositions. Such polymers include the polymers comprising cationic amine salt groups which are derived from pendant and/or terminal amino groups that are disclosed in United States Patent Application Publication 2003/0054193 A1 at [0064] to [0088], this portion of which being incorporated herein by reference. Also suitable are the active hydrogen-containing, cationic salt group-containing resins derived from a polyglycidyl ether of a polyhydric phenol that is essentially free of aliphatic carbon atoms to which are bonded more than one aromatic group, which are described in United States Patent Application Publication US 2003/0054193 A1 at [0096] to [0123], this portion of which being incorporated herein by reference.

To render the polymer dispersible in an aqueous medium, the polymer is, prior to or during dispersion in a dispersing medium comprising water, at least partially neutralized by, for example, treating with an acid to form a water-dispersible cationic salt group containing polymer. Non-limiting examples of suitable acids are inorganic acids, such as phosphoric acid and sulfamic acid, as well as organic acids, such as, acetic acid and lactic acid, among others. Besides acids, salts such as dimethylhydroxyethylammonium dihydrogenphosphate and ammonium dihydrogenphosphate can be used. In certain embodiments, the polymer is neutralized to the extent of at least 50 percent or, in some cases, at least 70 percent, of the total theoretical neutralization equivalent. The step of dispersion may be accomplished by combining the neutralized or partially neutralized polymer with the water of the dispersing phase. Neutralization and dispersion can be accomplished in one step by combining the polymer and the water.

In certain embodiments, the one or more active hydrogen-containing, cationic salt group-containing polymer(s) are present in the aqueous resinous dispersion of the present invention in an amount of 50 to 99 percent by weight, such as 70 to 95 percent by weight, based on the total solids weight of the aqueous resinous dispersion.

The aqueous resinous dispersions of the present invention further include a curing agent to react with the active hydrogen groups of the cationic salt group containing polymer described above. Non-limiting examples of suitable curing agents are at least partially blocked polyisocyanates, aminoplast resins and phenolic resins, such as phenolformaldehyde condensates including allyl ether derivatives thereof.

Suitable at least partially blocked polyisocyanates include aliphatic polyisocyanates, aromatic polyisocyanates, and mixtures thereof. In certain embodiments, the curing agent comprises an at least partially blocked aliphatic polyisocyanate. Suitable at least partially blocked aliphatic polyisocyanates include, for example, fully blocked aliphatic polyisocyanates, such as those described in U.S. Pat. No. 3,984,299 at col. 1 line 57 to col. 3 line 15, this portion of which being incorporated herein by reference, or partially blocked aliphatic polyisocyanates that are reacted with the polymer backbone, such as is described in U.S. Pat. No. 3,947,338 at col. 2 line 65 to col. 4 line 30, this portion of which also being incorporated herein by reference. By "blocked" is meant that the isocyanate groups have been reacted with a compound such that the resultant blocked isocyanate group is stable to active hydrogens at ambient temperature but reactive with active hydrogens in the film forming polymer at elevated temperatures usually between 90° C. and 200° C. In certain embodiments, the polyisocyanate curing agent is a fully blocked polyisocyanate with substantially no free isocyanate groups.

In certain embodiments, the curing agent comprises a diisocyanate, though, in other embodiments, higher polyisocyanates are used in lieu of or in combination with diisocyanates. Examples of aliphatic polyisocyanates suitable for use as curing agents include cycloaliphatic and araliphatic polyisocyanates such as 1,6-hexamethylene diisocyanate, isophorone diisocyanate, bis-(isocyanatocyclohexyl)methane, polymeric 1,6-hexamethylene diisocyanate, trimerized isophorone diisocyanate, norbornane diisocyanate and mixtures thereof. In certain embodiments of the present invention, the curing agent comprises a fully blocked polyisocyanate selected from a polymeric 1,6-hexamethylene diisocyanate, isophorone diisocyanate, and mixtures thereof. In other embodiments of the present invention the polyisocyanate curing agent comprises a fully blocked trimer of hexamethylene diisocyanate available as Desmodur N3300® from Bayer Corporation.

In certain embodiments, the polyisocyanate curing agent is at least partially blocked with at least one blocking agent selected from a 1,2-alkane diol, for example 1,2-propanediol; a 1,3-alkane diol, for example 1,3-butanediol; a benzylic alcohol, for example, benzyl alcohol; an allylic alcohol, for example, allyl alcohol; caprolactam; a dialkylamine, for example dibutylamine; and mixtures thereof. In certain embodiments, the polyisocyanate curing agent is at least partially blocked with at least one 1,2-alkane diol having three or more carbon atoms, for example 1,2-butanediol.

In certain embodiments, the blocking agent comprises other well known blocking agents such as aliphatic, cycloaliphatic, or aromatic alkyl monoalcohols or phenolic compounds, including, for example, lower aliphatic alcohols, such as methanol, ethanol, and n-butanol; cycloaliphatic alcohols, such as cyclohexanol; aromatic-alkyl alcohols, such as phenyl carbinol and methylphenyl carbinol; and phenolic compounds, such as phenol itself and substituted phenols wherein the substituents do not affect coating operations, such as cresol and nitrophenol. Glycol ethers and glycol amines may also be used as blocking agents. Suitable glycol ethers include ethylene glycol butyl ether, diethylene glycol butyl ether, ethylene glycol methyl ether and propylene glycol methyl ether. Other suitable blocking agents include oximes, such as methyl ethyl ketoxime, acetone oxime and cyclohexanone oxime.

Examples of suitable aminoplast resins include those described in U.S. Pat. No. 3,937,679 at col. 16, line 3 to col. 17, line 47, this portion of which being hereby incorporated by reference. As is disclosed in the aforementioned portion of the '679 patent, the aminoplast can be used in combination with the methylol phenol ethers.

As previously indicated, the aqueous resinous dispersions of the present invention comprise oxidized polyolefin particles. As used herein, "oxidized polyolefin particles" refers to carboxylic acid functionalized polyolefin, such as polyethylene and/or polypropylene, particles. In certain embodiments, the oxidized polyolefin particles comprise oxidized polyethylene particles that have an acid number of 10 to 40 mg KOH/g, such as 16 to 40 mg KOH/g, or, in some cases, 26 to 40 mg KOH/g, when measured according to ASTM D-1386. Moreover, in certain embodiments, the oxidized polyolefin particles comprise oxidized polyethylene particles that exhibit a melting point of 128° C. to 138° C., such as 137° C., when measured according to ASTM D-3954.

One desirable feature of the oxidized polyolefin particles used in the aqueous resinous dispersions of the present invention is their density. For example, in certain embodiments, the oxidized polyolefin particles, such as oxidized polyethylene particles, have a density of 0.8 to 1.5 g/cm$^3$, such as 0.8 to 1.0 g/cm$^3$, or, in some cases, 0.89 to 1.0 g/cm$^3$, when measured according to ASTM D-1505.

The particle size of the oxidized polyolefin particles used in the aqueous resinous dispersions of the present invention may vary. In certain embodiments, the particles will range in average particle size from 1 to 40 microns, such as 1 to 20 microns, 1 to 10 microns, or, in some cases, 5 to 6 microns. For certain applications where a coating thickness of approximately one mil or less is desired, an average particle size of 20 microns or less, such as 10 microns or less, such as 5 to 6 microns, is often used. For applications in which a thicker coat is deposited, such as 2 or 3 mils, or wherein the "smoothness" of the coating is not important, larger particle sizes can be employed, such as particles having an average particle size of up to 40 microns.

Oxidized polyolefin particles, particularly oxidized polyethylene particles, that are suitable for use in the present invention are commercially available from, for example, Honeywell International Inc. under the ACumist® name, specific examples of which include ACumist® A-5 (average particle size 5.0 to 6.0 microns, acid number 26 to 40 mg KOH/g), ACumist® A-6 (average particle size 6.0 to 7.5 microns, acid number 26 to 40 mg KOH/g), ACumist® A-12 (average particle size 10.0 to 13.0 microns, acid number 26 to 40 mg KOH/g), ACumist® A-18 (average particle size 16.0 to 19.0 microns, acid number 26 to 40 mg KOH/g), ACumist® A-45 (average particle size 30.0 to 40.0 microns, acid number 26 to 40 mg KOH/g), ACumist® 1812 (average particle size 8.3 to 9.3 microns, acid number 16 to 19 mg KOH/g), and ACumist® 1813 (average particle size 6.0 to 7.5 microns, acid number 16 to 19 mg KOH/g). Of course, if desired, combinations of any two or more of the foregoing can be used.

In certain embodiments, the oxidized polyolefin particles are present in the aqueous resinous dispersions of the present invention in an amount of 0.3 to 20 percent by weight, such as 1 to 10 percent by weight, or, in some cases 4 to 8 percent by weight, based on the total solids (i.e., non-volatile) weight of the aqueous resinous dispersion.

The oxidized polyolefin particles can be included in the aqueous resinous dispersions of the present invention in any desired manner, however, it has been discovered that it is beneficial to incorporate such particles by means of a paste in which the particles are mixed with a cationic polymer, and dispersed in a dispersing medium comprising water (and, optionally, organic solvent), and optionally one or more pigments or extenders. Examplary cationic polymers suitable for this purpose include acrylics and epoxy resins (although referred to as epoxy resins, these resins are more accurately described as being derived from epoxy resins in which the epoxy functionality has been reacted and is no longer present). In some embodiments, the polymer and a pigment and/or other solids are ground or mixed in a pigment grinding mill after which a liquid carrier, such as water and/or organic solvents, is added. The oxidized polyolefin particles can be incorporated, for example, in conjunction with the liquid carrier or after the liquid carrier has been added. The oxidized polyolefin particles can be incorporated into the paste by low-shear mixing until fully incorporated. Typically, this takes about 15 to 30 minutes, and can be performed, for example, using any kind of mixer such as those equipped with a Cowles blade.

Indeed, it was surprisingly discovered that a paste as described above, which comprises a mixture of oxidized polyolefin particles, which are acidic, and cationic resin, which is basic, remains stable rather than gelling due to the formation of salts groups resulting from their interaction. Without being bound by any theory, it is currently believed that the acid groups on the oxidized polyolefin particles are neutralized by first treating the particles with a cationic polymer, in which an excess of basic groups from the cationic polymer impart a net cationic charge to the polyolefin particles that are essentially "encapsulated" by the polymer. The resulting dispersion of neutralized polyolefin particles is then stable when combined with another, second, aqueous resinous dispersion that comprises an active hydrogen-containing, cationic salt group-containing polymer and, optionally, a curing agent.

In addition, it has been discovered that a paste as described above, which further comprises a traditional high density flatting agent, such as silica and/or alumina silicate particles, surprisingly exhibits good dispersion and anti-settling stability of the high density flatting agent. As used herein, "high density flatting agent" refers to flatting agent having a density of greater than 2 g/cm$^3$. As a result, certain embodiments of the present invention are directed to aqueous resinous dispersions as described herein, which further comprise a high density flatting agent.

As a result, the present invention is also directed to methods for making a cationically electrodepositable aqueous resinous dispersion. These methods comprise combining (i) a first aqueous resinous dispersion comprising an active hydrogen-containing, cationic salt group-containing polymer, and, optionally, a curing agent and/or other ingredients, and (ii) a second aqueous resinous dispersion comprising: (a) oxidized polyolefin particles; and (b) an active hydrogen-containing, cationic salt group-containing polymer cationic polymer and, optionally a high density flatting agent, such as silica, and/or other ingredients. In some embodiments, the second aqueous resinous dispersion does not include a curing agent. In some embodiments, the active hydrogen-containing, cationic salt group-containing polymer in the second aqueous resinous dispersion comprises a quaternary ammonium salt group-containing resin, such as those which are formed from reacting an organic polyepoxide with a tertiary amine acid salt. In certain embodiments, the first aqueous resinous dispersion comprises an amine salt-containing acrylic resin and, optionally, an at least partially blocked polyisocyanate.

In certain embodiments, the relative weight ratio of oxidized polyolefin particles and high density flatting agent in the aqueous resinous dispersions of the present invention ranges from 1:10 to 10:1, such as 1:5 to 5:1, or, in some cases, 1:2 to 2.1 or 1:1.5 to 1.5:1. Indeed, it has been discovered that aqueous resinous dispersions of the present invention that comprise a combination of oxidized polyolefin particles and high density flatting agent, even in relatively equal amounts by weight, can exhibit bath stability while still providing coatings of a desired low gloss level with a smooth, consistent finish.

The resin solids content of the aqueous resinous dispersions of the present invention depends upon the particular end use of the dispersion and is often not critical. Compositions containing at least 1 percent by weight, such as from 5 to 40 percent by weight or 5 to 20 percent by weight, resin solids are common By resin solids is meant the non volatile organic content of the composition, i.e., organic materials which will not volatilize when heated to 110° C. for 15 minutes and would exclude organic solvents.

In certain embodiments, the relative weight ratio of water to oxidized polyolefin particles in the aqueous resinous dispersions of the present invention is at least 30:1, such as at least 50:1, at least 70:1, or, in some cases, at least 90:1.

In certain embodiments, the aqueous resinous dispersions of the present invention comprise a catalyst to catalyze the reaction between the curing agent and the active hydrogen-containing polymer(s). Suitable cure catalysts include, without limitation, organotin compounds (e.g., dibutyltin oxide and dioctyltin oxide) and salts thereof (e.g., dibutyltin diacetate); other metal oxides (e.g., oxides of cerium, zirconium and bismuth) and salts thereof (e.g., bismuth sulfamate and bismuth lactate). In certain embodiments, the cure catalyst comprises a cyclic guanidine as described in U.S. Pat. No. 7,842,762 at col. 1, line 53 to col. 4, line 18 and col. 16, line 62 to col. 19, line 8, the cited portions of which being incorporated herein by reference. In some embodiments, however, the aqueous resinous dispersions of the present do not include an organotin compound.

In some instances, a pigment composition, and if desired, various additives such as fillers, plasticizers, anti-oxidants, UV light absorbers, defoamers, fungicides, flow control agents, surfactants or wetting agents are included in the aqueous resinous dispersions of the present invention. The pigment composition may be of the conventional types, comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as the pigment-to-resin weight ratio. In the practice of the present invention, the pigment-to-resin weight ratio is sometimes within the range of 0.03 to 0.35, when pigment is used. The other additives mentioned above are usually in the dispersion in amounts of 0.01 to 3 percent by weight based on total weight of resin solids.

In certain embodiments, the aqueous resinous dispersions of the present invention are deposited upon a electrically conductive substrate by placing the composition in contact with an electrically conductive anode and an electrically conductive cathode, with the surface to be coated being the cathode. Following contact with the composition, an adherent film is deposited on the cathode and a sufficient voltage is impressed between the electrodes. The applied voltage may be varied and can be, for example, as low as one volt to as high as several thousand volts, but is often between 50 and 500 volts. The current density is often between 0.5 ampere and 15 amperes per square foot and tends to decrease during electrodeposition indicating the formation of an insulating film.

Once the electrodepositable aqueous resinous dispersion is electrodeposited over at least a portion of the electroconductive substrate, the coated substrate is heated to a temperature and for a time sufficient to cure the electrodeposited coating on the substrate. In certain embodiments, the coated substrate is heated to a temperature ranging from 250° F. to 450° F. (121.1° C. to 232.2° C.), such as from 275° F. to 400° F. (135° C. to 204.4° C.), or, in some cases, from 300° F. to 360° F. (149° C. to 180° C.). The curing time can be dependent upon the curing temperature as well as other variables, for example, film thickness of the electrodeposited coating, level and type of catalyst present in the composition and the like. For purposes of the present invention, all that is necessary is that the time be sufficient to effect cure of the coating on the substrate.

For example, the curing time can range from 10 minutes to 60 minutes, such as 20 to 40 minutes.

In certain embodiments, the coated substrate is heated to a temperature of 360° F. (180° C.) or less for a time sufficient to effect cure of the electrodeposited coating on the substrate. The thickness of the resultant cured coating often ranges from 15 to 50 microns.

The electrodepositable aqueous resinous dispersion of the present invention can also, if desired, be applied to a substrate using non-electrophoretic coating application techniques, such as flow, dip, spray and roll coating applications. For electrodeposition and non-electrophoretic coating applications, the aqueous resinous dispersions of the present invention can be applied to a variety of electroconductive substrates especially metal such as steel, aluminum, copper, magnesium and the like, but also including metallized plastic and conductive carbon-coated materials. For non-electrophoretic coating applications, the aqueous resinous dispersions can be applied to the non-metallic substrates such as glass, wood and plastic.

In certain embodiments, therefore, the present invention is also directed to methods for coating an electroconductive substrate. In certain embodiments, such methods comprise (a) electrophoretically depositing on the substrate an aqueous resinous dispersion of the present invention and (b) heating the coated substrate to a temperature and for a time sufficient to cure the electrodeposited coating on the substrate. In certain embodiments, such methods comprise (a) electrophoretically depositing on the substrate an aqueous resinous dispersion of the present invention to form an electrodeposited coating over at least a portion of the substrate, (b) heating the coated substrate to a temperature and for a time sufficient to cure the electrodeposited coating on the substrate, (c) applying directly to the cured electrodeposited coating one or more pigment-containing coating compositions and/or one or more pigment-free coating compositions to form a top coat over at least a portion of the cured electrodeposited coating, and (d) heating the coated substrate of step (c) to a temperature and for a time sufficient to cure the top coat.

In certain embodiments, the cured coatings formed from the aqueous resinous dispersions of the present invention exhibit a "low gloss" which, as used herein, refers to a 60° gloss of no more than 40, such as no more than 30, or, in some cases, no more than 20.

Moreover, because the aqueous resinous dispersions of the present invention exhibit good "anti-settling" properties they have a reduced tendency to produce sediment on horizontal surfaces which can cause coatings having an uneven and rough appearance, particularly when coating complex parts and areas in which paint mixing is not consistent.

Illustrating the invention are the following examples, which, however, are not to be considered as limiting the invention to their details.

EXAMPLES

Example 1

Aqueous resinous dispersions were prepared using the ingredients and amounts (in parts by weight) identified in Table 1.

TABLE 1

| | Comparative Example 1 | Comparative Example 2 | Example 3 | Comparative Example 4 |
|---|---|---|---|---|
| Part A | | | | |
| Cationic resin[1] | 128.4 | 128.4 | 128.4 | — |
| ACumist ® B-12[2] | — | 36 | — | — |
| ACumist ® A5[3] | — | — | 36 | — |
| ACEMATT OK412LC[4] | 72 | 36 | 36 | — |
| Deionized Water | 279.6 | 279.6 | 279.6 | — |
| Part B | | | | |
| ELECTROCLEAR ® Resin[5] | 1520 | 1520 | 1520 | 2000 |
| Deionized Water | 2000 | 2000 | 2000 | 2000 |

[1]A quaternary ammonium salt group-containing resin prepared as described in U.S. Pat. No. 4,081,341 at col. 9, lines 16-57
[2]ACumist ® B-12 is a polyethylene wax (average particle size 10.0 to 11.5 microns) commercially available from Honeywell International Inc.
[3]ACumist ® A-5 is an oxidized polyethylene wax (average particle size 5.0 to 6.0 microns) commercially available from Honeywell International Inc.
[4]Silica flatting agent commercially available from Evonik Industries.
[5]Aqueous dispersion of a cationic acrylic resin and a blocked polyisocyanate crosslinker, CR965, available from PPG Industries, Inc.

Examples 1, 2 and 3 were prepared by combining the ingredients of Part A and mixing with a disperser blade at high speed for twenty minutes. Part A was then added to the resin in Part B under mild agitation. The mixture was then reduced with the deionized water of Part B and mixed for 24 hours before application. Example 4 was made by mixing components of Part B under mild agitation and mixing for 24 hours before application.

All examples were applied using conventional cationic electrodeposition techniques. Coatings were applied to 4"×6" aluminum panels (available from ACT Corporation). Application conditions were 30° C., 80 volts, for 30 to 60 seconds to obtain a cured film thickness of 15 to 17 microns. The coated panels were baked in an electric oven at 175° C. for 20 minutes. Results are set forth in Table 2.

TABLE 2

| | Comparative Example 1 | Comparative Example 2 | Example 3 | Comparative Example 4 |
|---|---|---|---|---|
| 60° Gloss | 20 | 43 | 21 | 116 |
| Roughness - Vertical (µin)1 | 19 | 8 | 15 | 3 |
| Roughness - Horizontal (µin)2 | 48 | 14 | 18 | 4 |
| Appearance | Uneven swirls of silica | Few uneven swirls of silica | Even consistent matte finish | Clear, even, high gloss finish |
| Solvent effect (50 rubs acetone) | Slightly polished | Waxy exudate layer rubs off | No effect | No effect |

[1]$R_a$ surface profile measured with Taylor-Hobson Surtronic 25. Panel coated after four weeks aging of paint bath.
[2]Horizontal surface formed by bending the bottom 2 inches of the test panel at a 90° angle to the vertical surface prior to coating application.

The data in Table 2 illustrates that in Example 3 gloss reduction was achieved with reduced silica loading. The silica was also unexpectedly stabilized and had much improved suspension, which was evident in the reduced roughness on the horizontal coating surface. In addition, the oxidized polyethylene particles did not tend to exude to the surface during curing. This eliminated the waxy or greasy layer caused by the non-oxidized particles.

Whereas particular embodiments of this invention have been described above for purposes of illustration, it will be evident to those skilled in the art the numerous variations of the details of the present invention may be made without departing from the invention as defined in the appended claims.

We claim:

1. An aqueous resinous dispersion comprising:
   (a) an active hydrogen-containing, cationic salt group-containing polymer;
   (b) a curing agent; and
   (c) 0.3 to 20 part by weight oxidized polyolefin particles, based on the total solids weight of the dispersion.

2. The dispersion of claim 1, wherein the active hydrogen-containing, cationic salt group-containing polymer comprises hydroxyl groups, primary amine groups and/or secondary amine groups.

3. The aqueous resinous dispersion of claim 2, wherein the curing agent comprises an at least partially blocked polyisocyanate.

4. The dispersion of claim 2, wherein the active hydrogen-containing, cationic salt group-containing polymer further comprises tertiary amine groups.

5. The aqueous resinous dispersion of claim 1, wherein the oxidized polyolefin particles comprise oxidized polyethylene particles.

6. The aqueous resinous dispersion of claim 5, wherein the oxidized polyethylene particles have an acid number of 26 to 40 mg KOH/g when measured according to ASTM D-1386 and a density of 0.8 to 1.0 g/cm$^3$, when measured according to ASTM D-1505.

7. The aqueous resinous dispersion of claim 5, wherein the oxidized polyethylene particles have an average particle size of 1 to 10 microns.

8. The aqueous resinous dispersion of claim 1, wherein the oxidized polyolefin particles are present in the aqueous resinous dispersion in an amount of 1 to 10 percent by weight, based on the total solids weight of the dispersion.

9. The aqueous resinous dispersion of claim 1, wherein the dispersion further comprises a high density flatting agent.

10. The aqueous resinous dispersion of claim 9, wherein the high density flatting agent comprises silica.

11. The aqueous resinous dispersion of claim 9, wherein a relative weight ratio of oxidized polyolefin particles and high density flatting agent in the aqueous resinous dispersion ranges from 1:2 to 2:1.

12. The aqueous resinous dispersion of claim 1, wherein a relative weight ration of water to oxidized polyolefin particles in the aqueous resinous dispersion is at least 30:1.

13. A method comprising depositing the aqueous resinous dispersion of claim 1 upon an electrically conductive substrate by placing the dispersion in contact with an electrically conductive anode and an electrically conductive cathode, with a surface to be coated being the cathode.

14. A method of making a cationically electrodepositable aqueous resinous dispersion comprising combining (i) a first aqueous resinous dispersion comprising an active hydrogen-containing, cationic salt group-containing polymer, and (ii) a second aqueous resinous dispersion comprising: (a) 0.3 to 20 parts by weight oxidized polyolefin particles, based on the total solids weight of the second aqueous resinous dispersion; (b) an active hydrogen-containing, cationic salt group-containing polymer; and (c) a curing agent.

15. The method of claim 14, wherein the first aqueous resinous dispersion further comprises a curing agent.

16. The method of claim 14, wherein the second aqueous resinous dispersion further comprises a high density flatting agent comprising silica.

17. The method of claim 16, wherein a relative weight ratio of oxidized polyolefin particles and high density flatting agent in the second aqueous resinous dispersion ranges from 1:2 to 2:1.

18. The method of claim 14, wherein the active hydrogen-containing, cationic salt group-containing polymer further comprises tertiary amine groups.

* * * * *